United States Patent
Davis

(10) Patent No.: US 9,088,961 B1
(45) Date of Patent: Jul. 21, 2015

(54) METHOD FOR SELECTING AND CONFIGURING WIRELESS CONNECTIONS IN AN ELECTRONIC DEVICE

(75) Inventor: Mark Davis, San Francisco, CA (US)

(73) Assignee: QUALCOMM Incorporated, San Diego, CA (US)

(*) Notice: Subject to any disclaimer, the term of this patent is extended or adjusted under 35 U.S.C. 154(b) by 742 days.

(21) Appl. No.: 10/040,700

(22) Filed: Dec. 28, 2001

(51) Int. Cl.
G06F 15/16 (2006.01)
H04W 76/00 (2009.01)

(52) U.S. Cl.
CPC .................................. *H04W 76/00* (2013.01)

(58) Field of Classification Search
USPC .......................... 709/206, 227, 230, 220, 223
See application file for complete search history.

(56) References Cited

U.S. PATENT DOCUMENTS

| | | | |
|---|---|---|---|
| 5,760,773 A * | 6/1998 | Berman et al. ................ 715/808 |
| 6,141,688 A * | 10/2000 | Bi et al. ........................ 709/227 |
| 6,678,516 B2 * | 1/2004 | Nordman et al. ............. 709/206 |
| 6,690,918 B2 * | 2/2004 | Evans et al. ................... 455/41.2 |
| 6,714,778 B2 * | 3/2004 | Nykanen et al. .............. 709/223 |
| 6,748,195 B1 * | 6/2004 | Phillips ......................... 370/338 |
| 6,785,542 B1 * | 8/2004 | Blight et al. .................. 709/245 |
| 6,795,688 B1 * | 9/2004 | Plasson et al. ................ 455/41.2 |
| 6,874,029 B2 * | 3/2005 | Hutcheson et al. .......... 709/227 |
| 6,888,811 B2 * | 5/2005 | Eaton et al. ................... 370/338 |
| 6,931,429 B2 * | 8/2005 | Gouge et al. ................. 709/203 |
| 6,961,567 B1 * | 11/2005 | Kuhn ............................ 709/227 |
| 6,965,948 B1 * | 11/2005 | Eneborg et al. .............. 709/227 |
| 6,970,869 B1 * | 11/2005 | Slaughter et al. ............ 709/219 |
| 6,973,306 B2 * | 12/2005 | Kim .............................. 709/219 |
| 6,996,402 B2 * | 2/2006 | Logan et al. ................ 455/456.1 |
| 7,013,133 B2 * | 3/2006 | Hayduk ........................ 709/201 |
| 7,027,836 B2 * | 4/2006 | Zacks et al. .................. 370/338 |
| 7,043,205 B1 * | 5/2006 | Caddes et al. ............... 455/41.2 |
| 7,170,857 B2 * | 1/2007 | Stephens et al. ............. 370/230 |
| 7,200,389 B2 * | 4/2007 | Date et al. .................... 455/419 |
| 7,249,100 B2 * | 7/2007 | Murto et al. ................... 705/50 |
| 7,389,334 B2 * | 6/2008 | Giliberto et al. ............. 709/227 |
| 7,536,182 B2 * | 5/2009 | Zhang .......................... 455/420 |
| 2002/0012329 A1 * | 1/2002 | Atkinson et al. ............. 370/330 |
| 2002/0184128 A1 * | 12/2002 | Holtsinger ..................... 705/35 |
| 2012/0258700 A1 * | 10/2012 | Chang et al. ................. 455/418 |

OTHER PUBLICATIONS

Specification of the Bluetooth System, Version 1.1, Feb. 22, 2001.*
Bruno, R. et al. "WLAN technologies for Mobile ad hoc Networks." Proceedings of the 34th Annual Hawaii Conference on System Sciences, 2001, IEEE Press.*

(Continued)

*Primary Examiner* — Jeffrey R Swearingen
(74) *Attorney, Agent, or Firm* — Mahamedi Paradice LLP

(57) ABSTRACT

A method for selecting and configuring Bluetooth connections in an electronic device. A graphical user interface is displayed upon an electronic device. A current network profile is selected from multiple available Bluetooth network profiles displayed by the graphical user interface. When a current network profile is selected, the associated connection profile for the current network is automatically displayed. The electronic device is then connected to the current network by communicatively coupling with a Bluetooth wireless device coupled with the current network.

11 Claims, 17 Drawing Sheets

(56) References Cited

OTHER PUBLICATIONS

Lansford, Jim et al. "Wi-Fi (802.11b) and Bluetooth: Enabling Coexistence." IEEE Network. vol. 15, Issue 5. Sep.-Oct. 2001. 20-27.*

Natarajan, Balasubramaniam et al. "Enhanced Bluetooth and IEEE 802.11 (FH) via Multi-Carrier Implementation of the Physical Layer". 2001 IEEE Technologies Symposium on Broadband Communications for the Internet Era. IEEE Press. Sep. 2001. pp. 129-13.*

\* cited by examiner

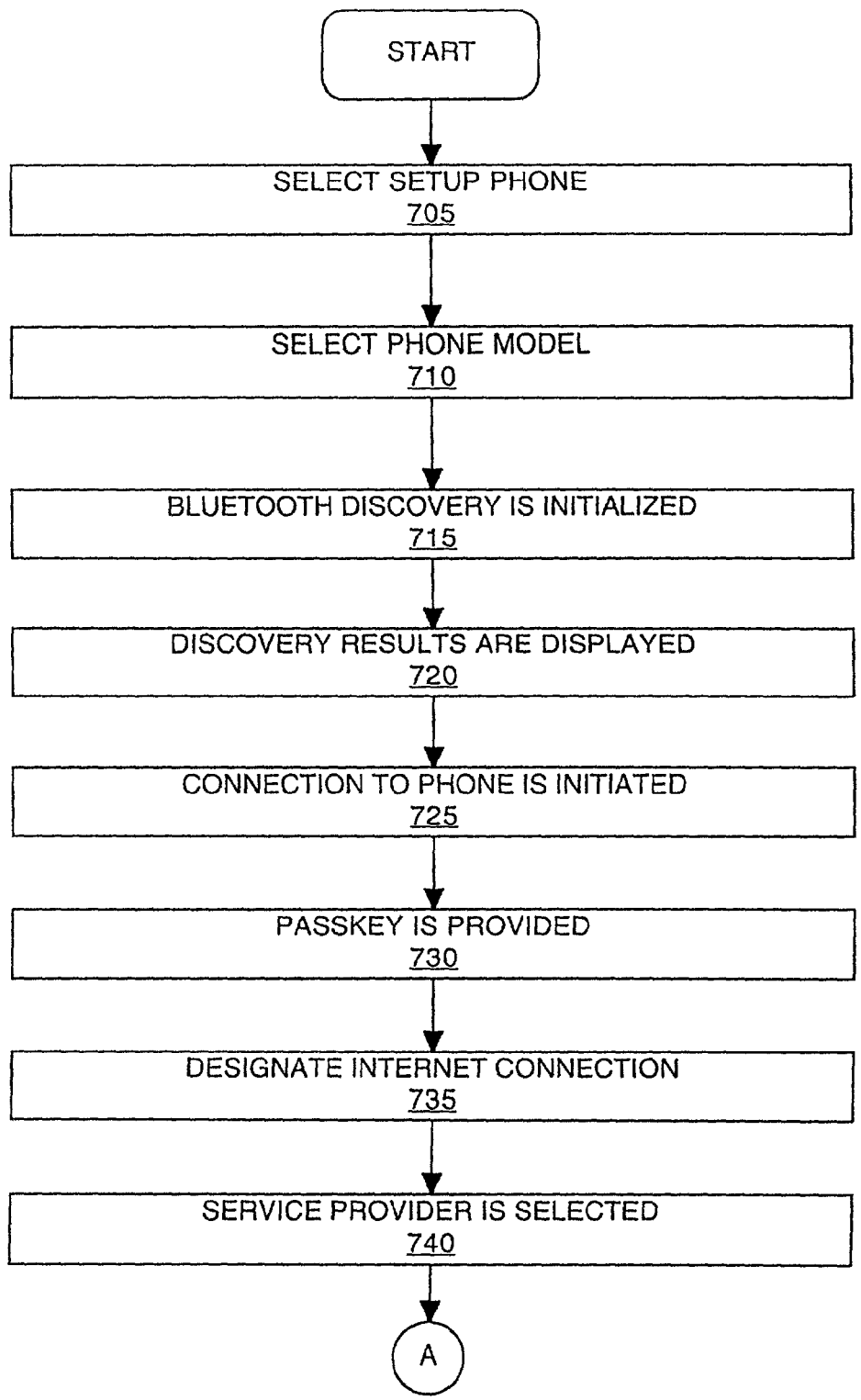

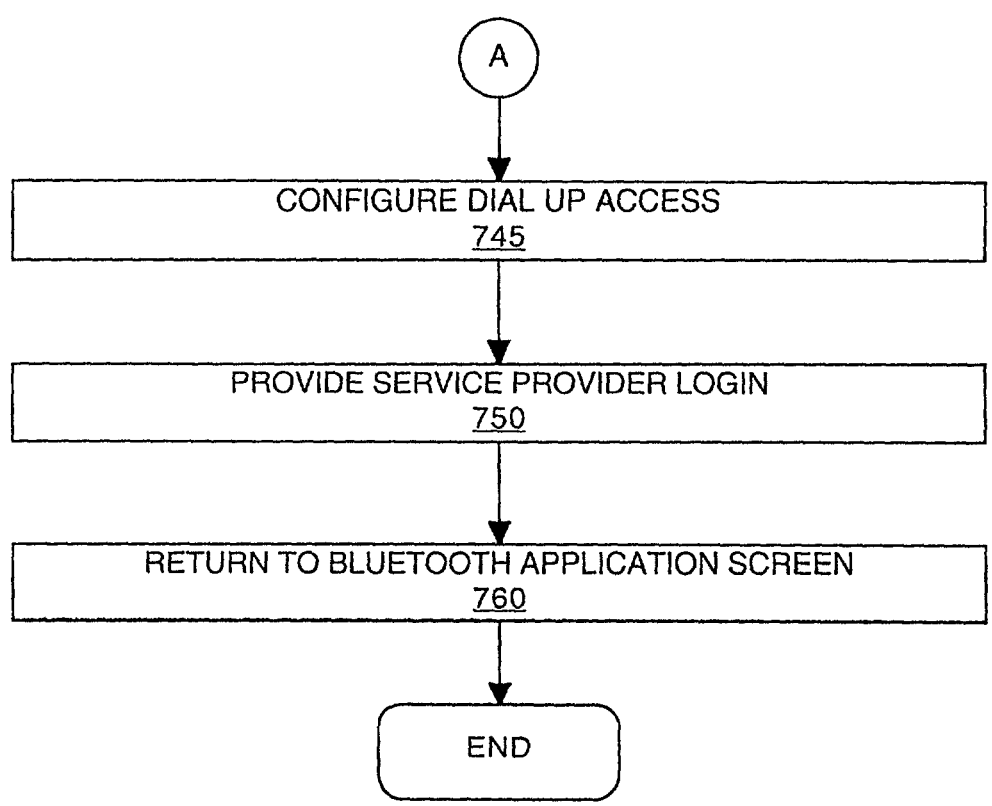

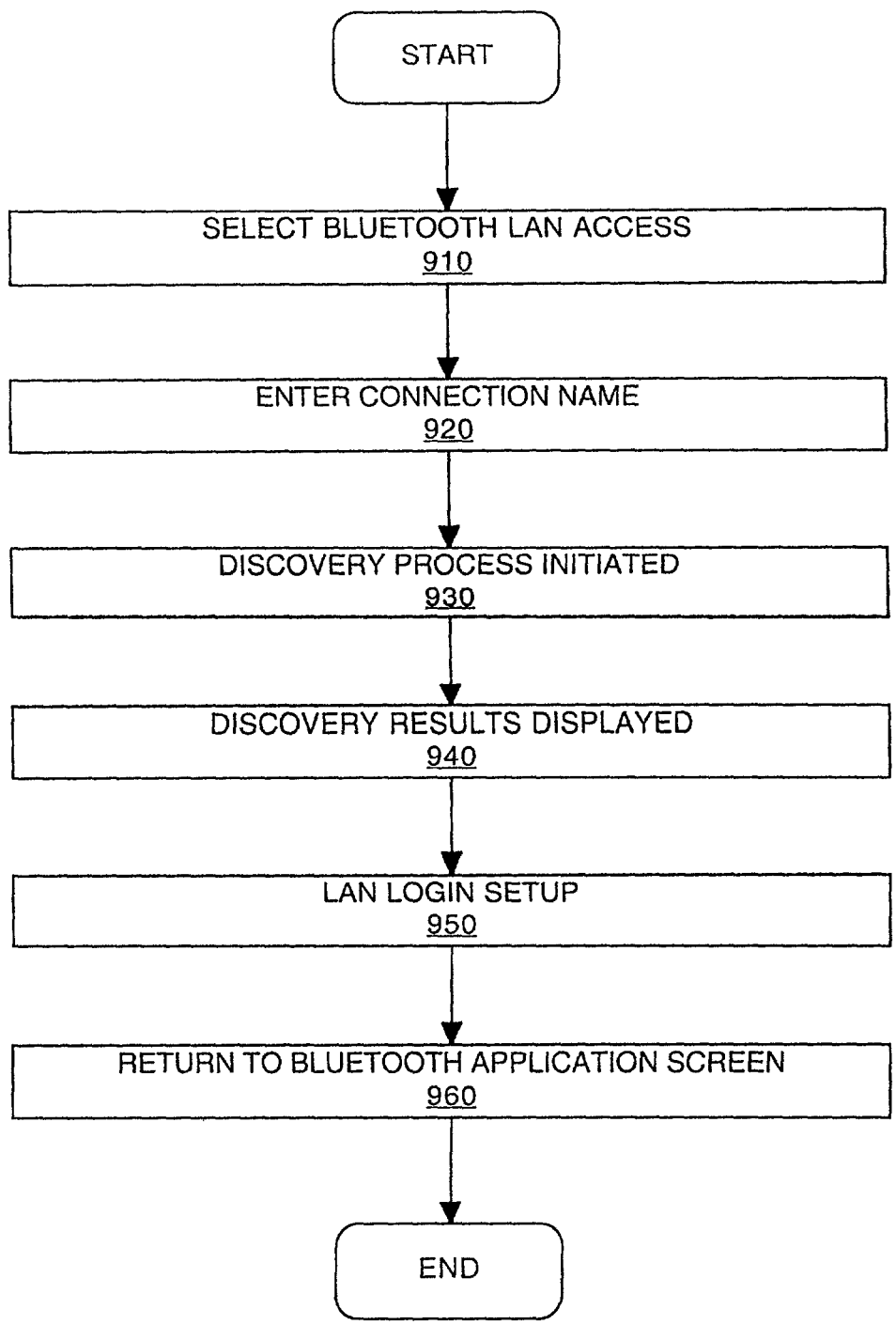

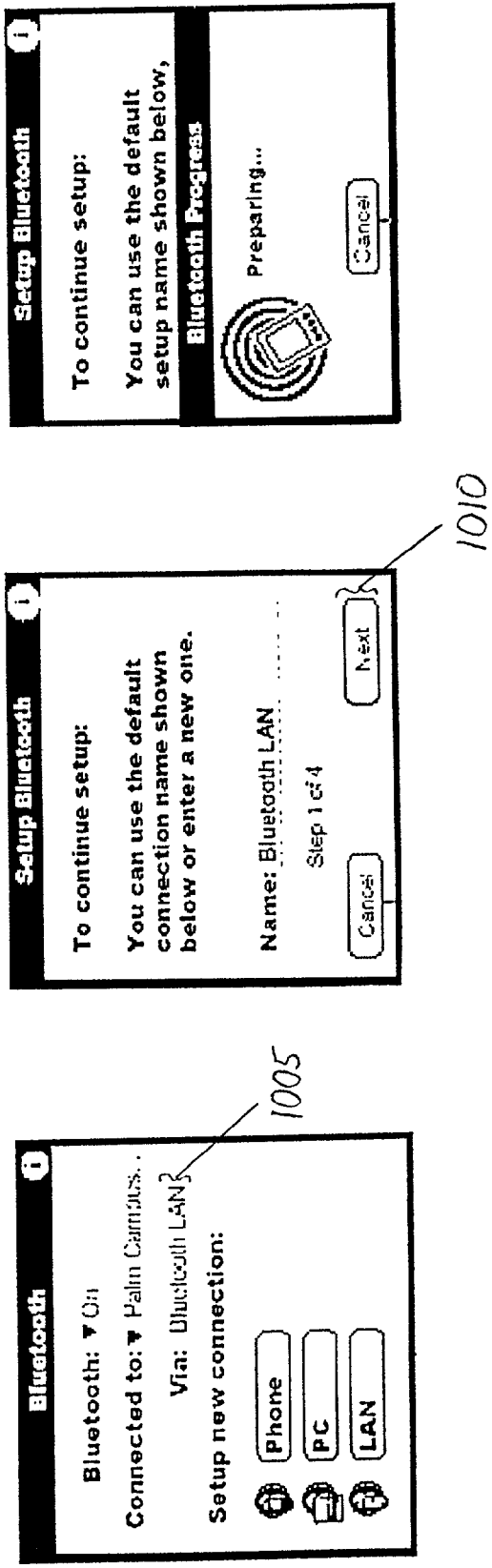

METHOD FOR SELECTING AND CONFIGURING WIRELESS CONNECTIONS IN AN ELECTRONIC DEVICE

FIELD OF THE INVENTION

The present invention relates to the field of portable electronic devices. More specifically, embodiments of the present invention are directed to a user interface for configuring Bluetooth connections in an electronic device and selecting a Bluetooth network connection.

BACKGROUND OF THE INVENTION

Advances in computer technology have enabled the further miniaturization of the components required to build computer systems. As such, new categories of computer systems have been created. One of the newer categories of computer systems is the portable, hand held, or "palmtop" computer system, also referred to as a personal digital assistant or PDA. Other examples of a portable computer system include electronic address books, electronic day planners, electronic schedulers and the like.

A handheld computer system is a computer that is small enough to be held in the user's hand and, as a result, handhelds are readily carried about in the user's briefcase, purse, and in some instances, in the user's pocket. By virtue of its size, the handheld computer, being inherently lightweight, is therefore exceptionally portable and convenient.

One problem encountered with prior art handheld computer systems is the lack of an intuitive user interface for selecting and configuring network connection options. In some operating systems for handheld computer systems, it is difficult for users to discern the connection between network (e.g., Internet Service Provider or ISP) profiles and connection profiles (e.g., Bluetooth or Transmission Control Protocol/Internet Protocol). Specifically, each network profile must be configured with a connection profile. Thus it has proven problematic for some users to correctly configure a network profile, as the need to configure a connection profile is not clearly communicated to the user. Furthermore, in some handheld computers systems, access to the connection profile screen is embedded within the network profile. This makes it unlikely that an inexperienced user will realize the importance of configuring a connection profile when configuring their network profiles Another commonly encountered problem with prior art systems is that when switching network profiles, many users do not know that they must also switch the connection profile. Again this is attributable to the connection profile being embedded within the network profile which means that the link between a network profile and the connection profile is not readily apparent to most users. As access to the connection profile screen is embedded within the network profile, it is difficult for users to switch between network profiles easily and quickly.

For example, a user can pair a handheld computer with a cell phone in order to access the Internet while commuting to work. Upon arriving at work, the user may then want to switch their network profile to take advantage of the faster Internet connection provided by a local LAN. Using a prior art system, the user must navigate a variety of screens in the network profile before successfully switching the connection profile and thus enable communication on the LAN. This is both time consuming and, for some users, a confusing process as the connection profiles are not clearly associated with any given network profiles.

SUMMARY OF THE INVENTION

Thus, a need exists for a method for selecting and configuring network and connection profiles in an electronic device which more clearly links the relationship between these profiles for a user. Specifically, a need exists for a method which allows user to more clearly understand the correlation between network profiles and connection profiles. Furthermore, a need exists for a method which allows a user to more easily select between different network profiles and links one selected network profile with all appropriate and available connection profiles.

Accordingly, the present invention provides a method for selecting and configuring network and connection profiles in an electronic device. The present invention further provides a method which allows a user to more clearly understand the relationship between network profiles and connection profiles. Additionally, the present invention provides a method which allows a user to more easily select between network profiles and automatically displays available connection profiles when a network profile is selected.

In one embodiment, the present invention displays a graphical user interface on an electronic device. A current network profile is selected from a list of available Bluetooth network profiles displayed by the graphical user interface. When the current network profile is selected, an associated connection profile is automatically displayed. Other connection profiles which have been configured for use with the current network profile can be used also. The electronic device is then connected to the current network by communicatively coupling it with a Bluetooth wireless device associated with the current network. The present invention clearly correlates the connection between a network profile and its associated connection profiles and allows a user to easily switch network profiles by automatically displaying and linking available connection profiles.

These and other advantages of the present invention will become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

FIGS. 7A and 7B are a flow chart of a method for configuring a new Bluetooth Phone connection in accordance with one embodiment of the present invention.

FIG. 9 is a flow chart of a method for configuring a new Bluetooth LAN connection in accordance with one embodiment of the present invention.

FIGS. 10A-10G show exemplary graphical user interface screens used in configuring new Bluetooth LAN connections is accordance with one embodiment of the present invention.

DETAILED DESCRIPTION OF THE PREFERRED EMBODIMENT

Reference will now be made in detail to the preferred embodiments of the present invention, examples of which are illustrated in the accompanying drawings. While the present invention will be described in conjunction with the preferred embodiments, it will be understood that they are not intended to limit the present invention to these embodiments. On the contrary, the present invention is intended to cover alternatives, modifications, and equivalents which may be included within the spirit and scope of the present invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signal capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "displaying," "designating," "coupling," "configuring," "initiating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
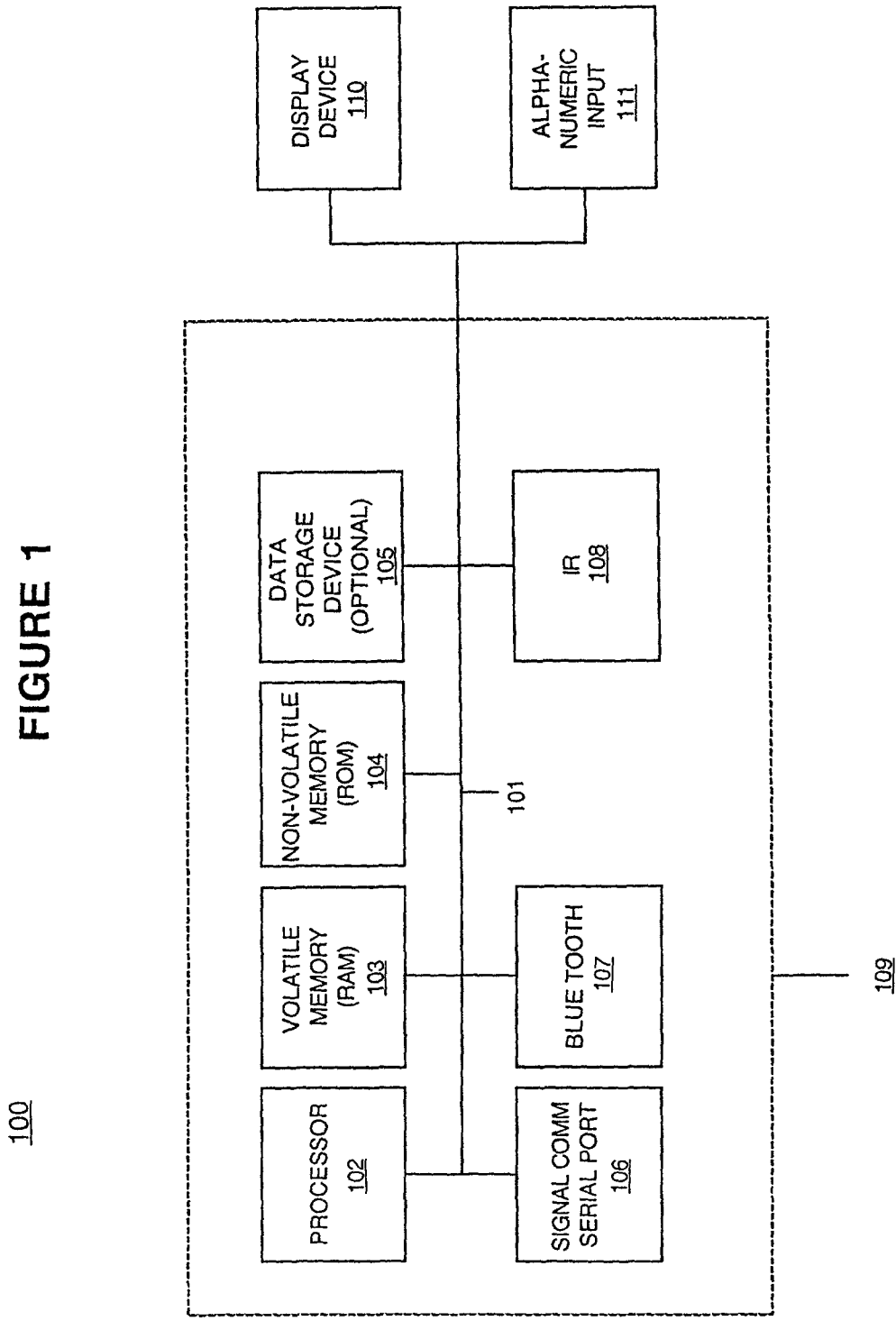
FIG. 1 illustrates an exemplary portable computer system upon which embodiments of the present invention may be utilized.

FIG. 1 illustrates exemplary circuitry of portable computer system 100. Portable computer system 100 includes an address/data bus 101 for communicating information, a central processor 102 coupled with the bus 101 for processing information and instructions, a volatile memory 103 (e.g., random access memory RAM) coupled with the bus 101 for storing information and instructions for the central processor 102 and a non-volatile memory 104 (e.g., read only memory ROM) coupled with the bus 101 for storing static information and instructions for the processor 102. Portable computer system 100 also includes an optional data storage device 105 (e.g., thin profile removable memory) coupled with the bus 101 for storing information and instructions and which can be removable.

As described above, portable computer system 100 also contains a signal communication device 106, also coupled to bus 101. Signal communication device 106 can be a serial port (or USB port) for communicating with a cradle (not shown). In addition to device 106, wireless communication links can be established between the portable computer system 100 and a host computer system (or another portable computer system) using a Bluetooth wireless device 107 or an infrared device 108. These components are housed on a circuit board 109 which is contained within a cover assembly.

Also included in computer system 100 of FIG. 1 is a display device 110. Display device 110 may be a liquid crystal display, field emission device (FED, also called flat panel CRT), organic light emitting diode (OLED), e-ink, or any other display device suitable for creating graphic images and alphanumeric characters recognizable to the user.

Device 100 also includes an alphanumeric input device 111 coupled with bus 101. In the present invention, the input device 111 may include a flat panel resistive touch screen display. Input device 111 can communicate information (spatial data) and command selections to the central processor 102. Input device 111 is capable of registering a position on the display device 110 where contact is made.

Figure 2:
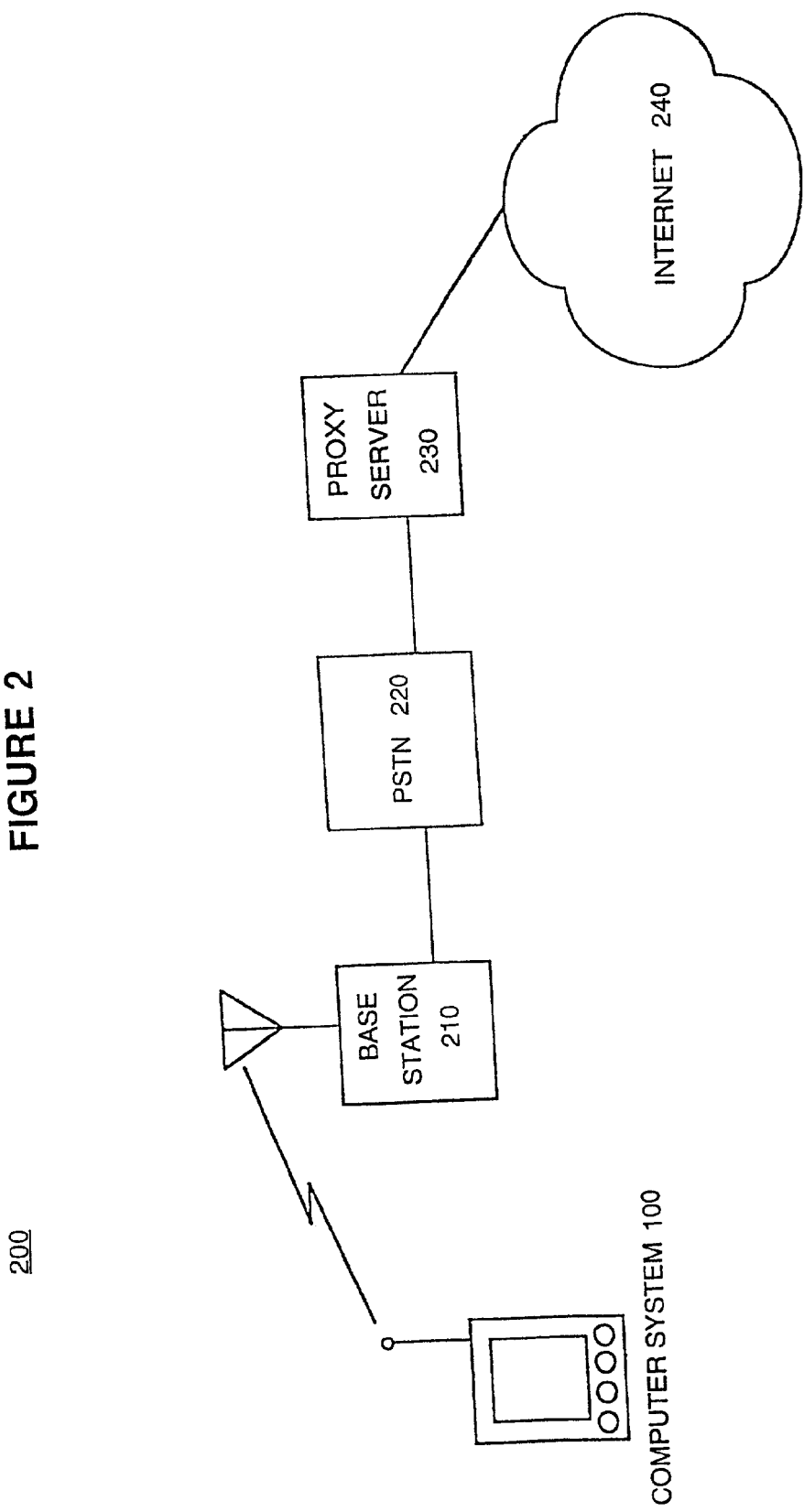
FIG. 2 is a diagram of an exemplary computer network including a portable computer system utilized in accordance with embodiments of the present invention.

FIG. 2 is a block diagram of an exemplary network environment 200 including a portable computer system (e.g., portable computer system 100) upon which embodiments of the present invention may be practiced, in accordance with one embodiment of the present invention. Portable computer system 100 is also known as a handheld computer system. Portable computer system 100 has the ability to transmit and receive data and information over a Bluetooth wireless communication interface (e.g., a radio interface). For purposes of the present application, the term "portable computer system" is not intended to be limited solely to conventional handheld or portable computers. Instead, the term "portable computer" or "portable computer system" is also intended to include any mobile electronic device. Such mobile devices include but are not limited to pagers and paging systems, wireless and cellular telephones, electronic address books, and numerous other mobile devices that may have the ability to conduct wireless communications with a network. As such, for purposes of the present application, the terms "handheld computer," "portable computer," and "mobile device" will be considered synonymous and will be used interchangeably.

Base station 210 can be both a transmitter and receiver base station, which can be implemented by coupling it into an existing public switched telephone network 220. Implemented in this manner, base station 210 enables portable computer system 100 to communicate with a proxy server computer system 230, which is coupled by wire to the existing public switched telephone network 220. Furthermore, proxy server computer system 230 is coupled to the Internet 240, thereby enabling portable computer system 100 to communicate with the Internet 240. When communicating with a Web site over Internet 240, protocols such as CTP (Compact Transport Protocol) and CML (Compact Markup Language) and WML (Wireless Markup Language) can be used by portable computer system 100 in the present embodiment.

It should be appreciated that one of the functions of proxy server 230 is to perform operations over the Internet 240 on behalf of portable computer system 100. For example, proxy server 230 has a particular Internet address and acts as a proxy device for portable computer system 100 over the Internet 240. It should be further appreciated that other embodiments of a communications network, planned or envisioned, may be utilized in accordance with the present invention. For example, a wireless connection may be made from portable computer system 100 directly to the Internet 240.

The data and information which are communicated between base station 210 and portable computer system 100 are the same type of information and data that can conventionally be transferred and received over a public switched telephone network. Additionally, in FIG. 2, the existing public switched telephone network could also be a packet-based network utilized by some conventional portable computer systems. However, a wireless communication interface is utilized to communicate data and information between portable computer system 100 and base station 210. Furthermore, nearly any wireless network can support the functionality to be disclosed herein.

Bluetooth is the trade name for a technology specification for small form factor, low-cost, short-range radio links between personal computers (PCs), hand held computers, mobile phones and other devices and appliances. The Bluetooth technology allows cables that typically connect one device to another to be replaced with short-range radio links. Bluetooth is targeted at mobile and business users who need to establish a link, or small network, between their computer, cellular phone and other peripherals. The required and nominal range of Bluetooth is thus set to approximately ten (10) meters. To support other uses, for example the home environment, Bluetooth can be augmented to extend the range to up to 100 meters.

Bluetooth technology is based on a high-performance, yet low-cost, integrated radio transceiver. For instance, Bluetooth transceivers built into both a cellular telephone and a hand held computer system would replace the cables used today to connect a hand held to a cellular telephone. Bluetooth radio technology can also provide a universal bridge to existing data networks, a peripheral interface, and a mechanism to form small private ad hoc groupings of connected devices away from fixed network infrastructures.

Figure 3:
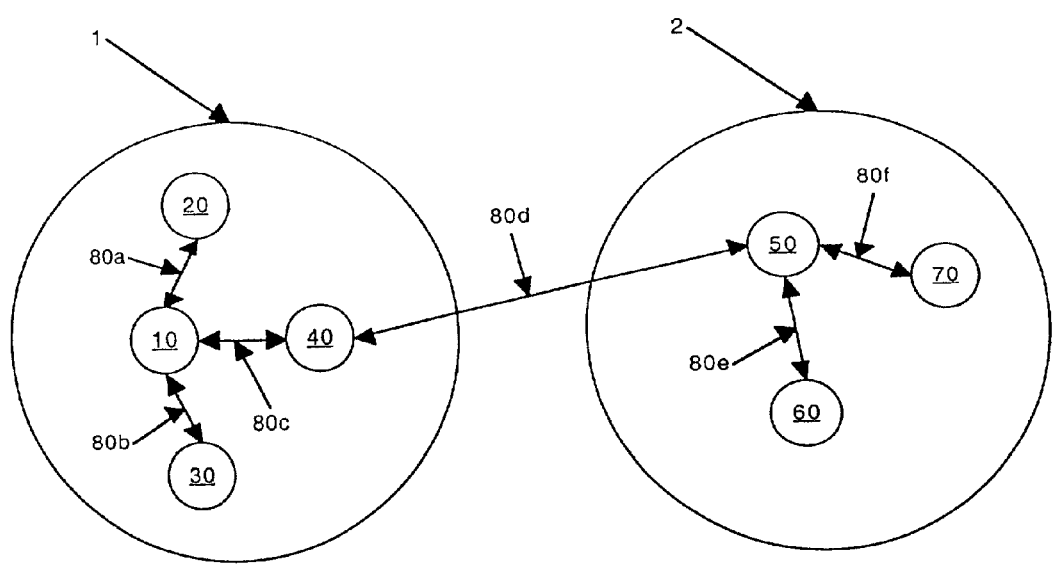
FIG. 3 illustrates a topology of a network of device coupled using wireless connections in accordance with one embodiment of the present invention.

FIG. 3 illustrates a topology of a network of devices coupled using wireless connections in accordance with one embodiment of the present invention. In the parlance of Bluetooth, a collection of devices connected in a Bluetooth system are referred to as a "piconet" or a "subnet." In the present embodiment, a piconet starts with two connected devices, and may incorporate up to eight connected devices. All Bluetooth devices are peer units; however, when establishing a piconet, one unit will act as a master and the other(s) as slave(s) for the duration of the piconet connection.

A Bluetooth system supports both point-to point and point-to-multi-point connections. Several piconets can be established and linked together in a "scatternet," where each piconet is identified by a different frequency hopping sequence. All devices participating on the same piconet are synchronized to their respective hopping sequence.

Accordingly, devices 10, 20, 30, and 40 are coupled in piconet 1 using wireless connections 80a-80c. Similarly, devices 50, 60, and 70 are coupled in piconet 2 using wireless connections 80e-80f. Piconet 1 and 2 are coupled using connection 80d, which may be wireless or carried over another type of network. Devices 10-70 can be printers, personal digital assistants (PDAs), desktop computer systems, laptop computer systems, cell phones, fax machines, keyboards, and joysticks equipped with a Bluetooth radio transceiver or adapted to communicate with Bluetooth devices ("Bluetooth-enabled"). In accordance with the present invention, devices 10-70 can also be virtually any type of device, including mechanical devices and appliances, equipped with a Bluetooth radio transceiver or Bluetooth-enabled. The Bluetooth radio transceiver may be integrated into the device, or it may be coupled to the device.

Figure 4B:
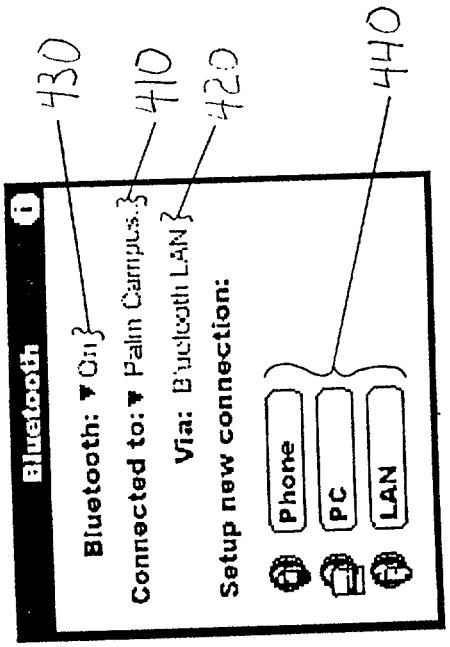
FIGS. 4A and 4B show exemplary graphical user interfaces used in accordance with embodiments of the present invention.
Figure 4A:
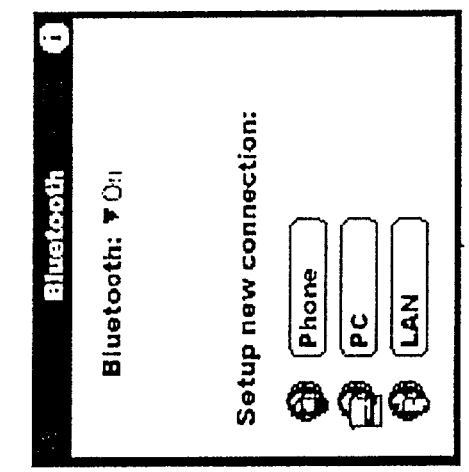

FIGS. 4A and 4B show exemplary Bluetooth Application Connection screens used in embodiments of the present invention. FIG. 4A shows a Bluetooth Application Connection screen of a portable electronic device which does not currently have an active Bluetooth network connection. When no Bluetooth network has been configured, another network type (e.g., a non-Bluetooth wireless communications network) is the current network connection, or the Bluetooth transceiver is switched off, the application does not reveal the "Connected to" or "Via" user interfaces. If the user has setup a new Bluetooth network profile, the switchable "Connected to" and non-switchable "Via" user interfaces will be shown on completion with the current network profile and Bluetooth connection profile filled in (as seen in FIG. 4B). This is for Bluetooth Phone and LAN connections. In one embodiment of the present invention, a Bluetooth PC connection profile is not automatically displayed as the connection is generally used in conjunction with synchronizing the electronic device with a desktop computer and multiple connection profiles would be unnecessarily redundant.

FIG. 4B shows a Bluetooth Application Connection screen of a portable electronic device which has been configured with a Bluetooth LAN Access connection. Once a Bluetooth connection has been defined, either a Phone, PC, or LAN access point, the "Connected to" user interface 410 allows easy switching between Bluetooth network connections. The "Via" user interface 420 displays the type of connection used to access the network or Internet Service Provider listed in the "Connected to" user interface. Again, in one embodiment of the present invention, a Bluetooth PC connection profile is not automatically displayed as the connection is generally used in conjunction with synchronizing the electronic device with a desktop computer and multiple connection profiles would be unnecessarily redundant. The "Bluetooth" user interface 430 is used to turn on/off the Bluetooth transceiver in order to, for example, conserve the battery or when on an airplane. The "Setup new connection:" user interface 440 is for configuring new connections with Bluetooth enabled phones, PCs, and LANs.

Figure 5:
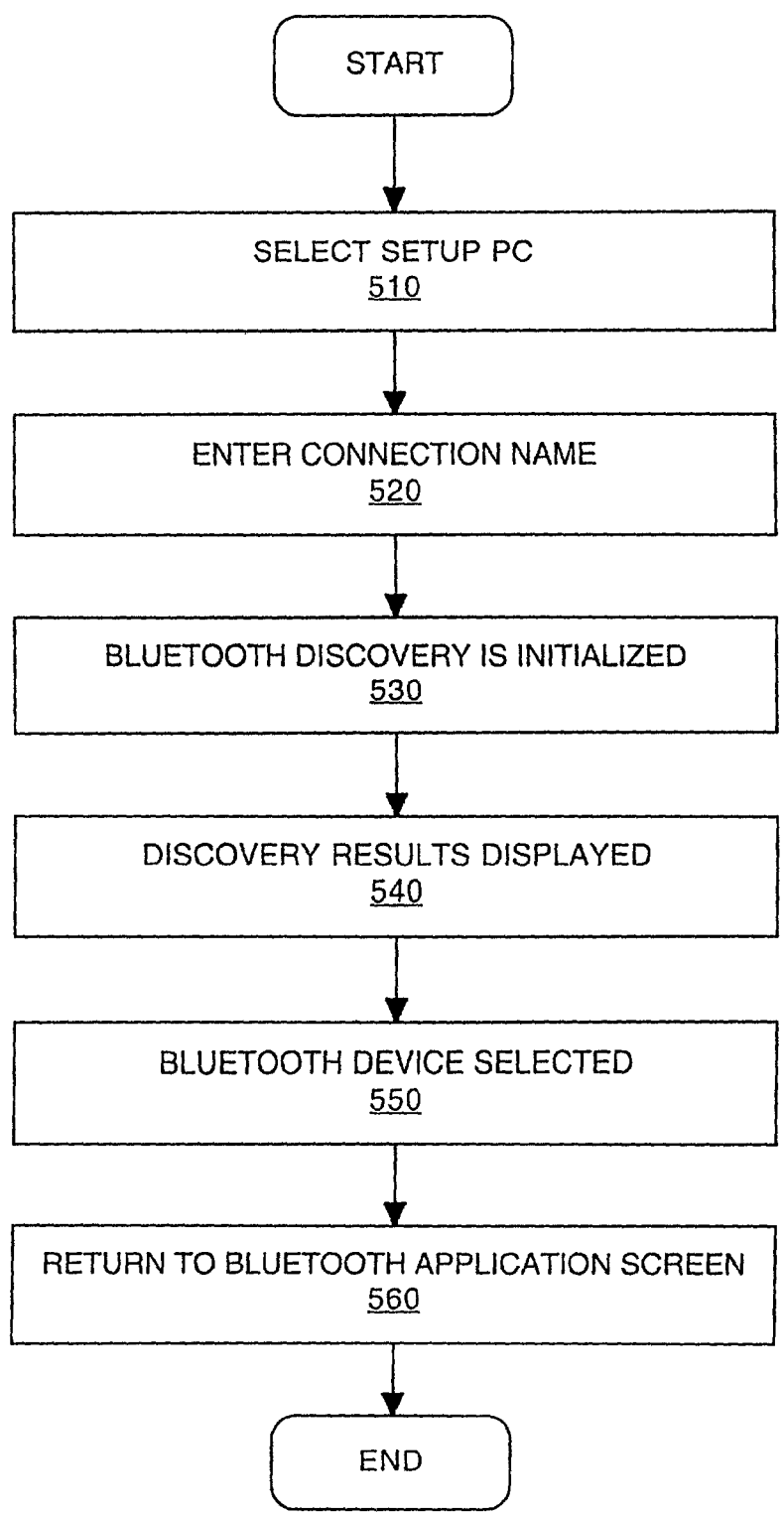
FIG. 5 is a flow chart of a method for configuring a new Bluetooth PC connection in accordance with one embodiment of the present invention.

FIG. 5 is a flow chart of a method for configuring a new Bluetooth PC connection in accordance with one embodiment of the present invention. Upon completion, a user will have successfully configured a network connection between a handheld computer and a desktop computer system using Bluetooth PC. FIGS. 6A-6E show exemplary graphical user interface screens used in configuring new Bluetooth PC connections is accordance with embodiments of the present invention as set forth in flow chart 500 of FIG. 5. For purposes of clarity, the following discussion will utilize the exemplary screens of FIGS. 6A-6E in conjunction with flow chart 500 of FIG. 5, to clearly describe one embodiment of the present invention.

Figure 6A:
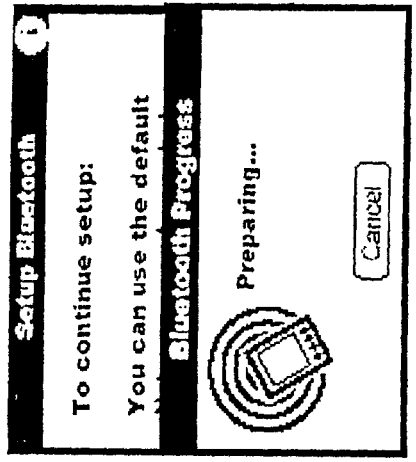
FIGS. 6A-6E show exemplary graphical user interface screens used in configuring new Bluetooth PC connections is accordance with one embodiment of the present invention.

With reference to FIG. 6A, and to step 510 of FIG. 5, Setup PC is selected. As shown in FIG. 6A, a Bluetooth LAN connection already exists. When a user elects to configure a new Bluetooth PC connection, various screens are automatically generated in a sequence which will guide the user through properly configuring the connection. Because the electronic device will connect directly with a designated PC, the "Via" user interface 610 is not relevant and will not be displayed once the connection profile is properly configured.

Figure 6B:
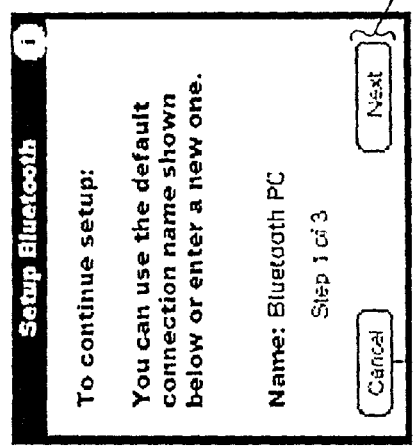

With reference to FIG. 6B, and to step 520 of FIG. 5, a connection name is entered. Screen 6B is displayed allowing a user to use the default connection name by tapping on the "Next" user interface 615. As shown in FIG. 6B, the default connection name is "Bluetooth PC". Alternatively, a user can enter a different connection name by writing in the graffiti area of the handheld computer (not shown) and tapping on the "Next" user interface 615. Another screen (not shown) is then displayed instructing the user that, in some cases, a user name and password may be needed to connect with the desktop computer unless this has been previously set up by a network administrator or is not necessary.

Figure 6C:
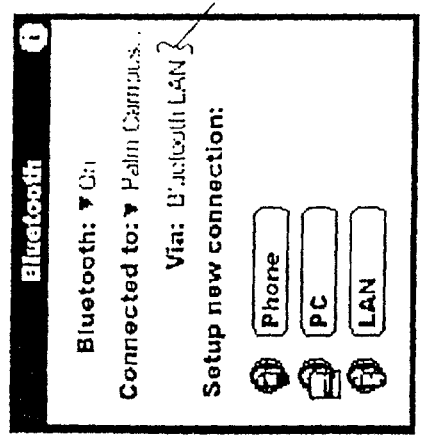

With reference to FIG. 6C, and to step 530 of FIG. 5, Bluetooth discovery is initialized. FIG. 6C shows a Bluetooth discovery dialog screen which is displayed when Bluetooth is preparing to initialize the discovery process. Subsequent Bluetooth discovery dialog screens (not shown) keep a user informed regarding the progress of the discovery process. In the discovery process, other Bluetooth devices which are in range of the handheld computer and having the connection type the user has selected (e.g., Bluetooth PC) are sought. After an initial discovery period, a Bluetooth discovery dialog screen is displayed which tells the user how many Bluetooth devices were discovered. Next, a discovery dialog screen is displayed informing the user that the device names of the discovered Bluetooth devices are searched for. Alternatively, if no devices have been found within the pre-defined discovery period, an discovery error dialog screen is displayed telling the user that no devices were discovered. The user has the option of stopping the Bluetooth PC setup at this point or initiating the discovery process again.

Figure 6E:
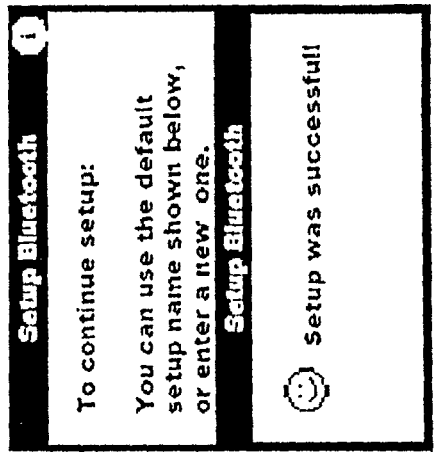
Figure 6D:
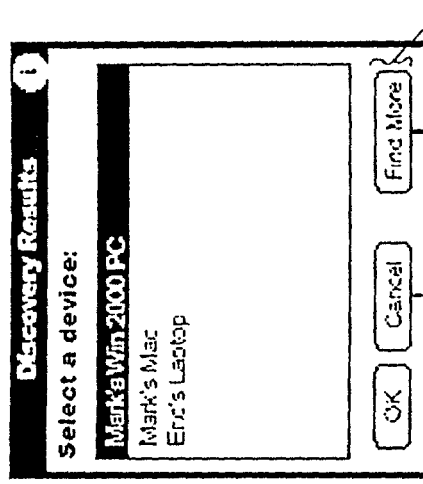

With reference to FIG. 6D, and to step 540 of FIG. 5, Bluetooth discovery results are displayed. As shown in FIG. 6D, a list of the Bluetooth devices of the type selected that are discoverable is displayed. The first device on the list is highlighted by default. At this point, the user may initiate another Bluetooth discovery if, for example, the desired device is not listed in the discovery results by tapping the "Find More" user interface 620. Canceling a discovery initiated at this point returns the user to the original discovery results screen as shown in FIG. 6D.

With reference to step 550 of FIG. 5, a Bluetooth device is selected as the default device with which the handheld computer will connect using the Bluetooth PC connection. The user may choose to connect with the default device highlighted in the discovery results screen. Alternatively, the user may select a different device on the discovery results list if the default device is not the device with which the user wants to connect. If the user selects one of the devices listed on the discovery results screen, the screen shown in FIG. 6E is displayed informing the user that the setup was successful. At this point, the Bluetooth connection has been properly configured.

With reference to step 560 of FIG. 5, the user is returned to the original Bluetooth Application Connection screen. As shown in FIG. 6A, the current network profile is not changed upon successfully configuring a new connection. Rather, the previous current network profile is displayed until a new network profile is selected.

Thus, the present invention provides a method for configuring a Bluetooth PC connection that clearly shows a user the connection between a given network profile and its associated connection profiles.

FIGS. 7A and 7B are a flow chart of a method for configuring a new Bluetooth Phone connection in accordance with one embodiment of the present invention. FIGS. 8A-8L show exemplary graphical user interface screens used in configuring new Bluetooth Phone connections is accordance with one embodiment of the present invention as set forth in flow chart 700 of FIGS. 7A and 7B. For purposes of clarity, the following discussion will utilize the exemplary screens of FIGS. 8A-8L in conjunction with flow chart 700 of FIGS. 7A and 7B, to clearly describe one embodiment of the present invention.

Figure 8C:
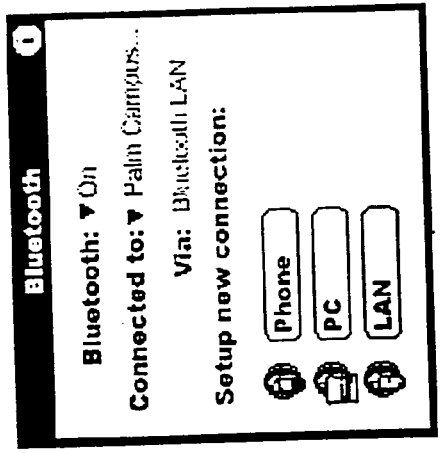
FIGS. 8A-8L show exemplary graphical user interface screens used in configuring new Bluetooth Phone connections is accordance with one embodiment of the present invention.
Figure 8B:
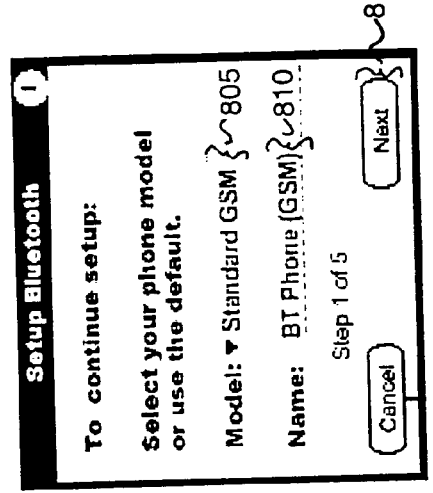
Figure 8A:
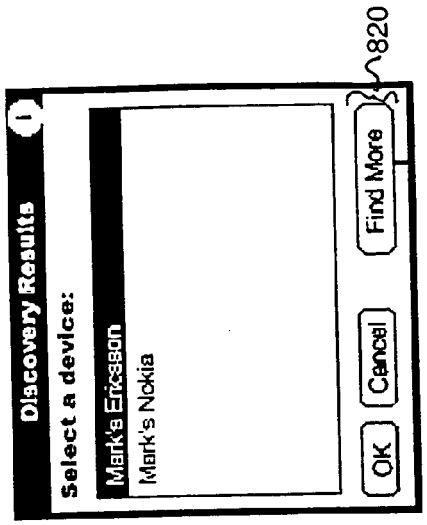

With reference to FIG. 8A, and to step 705 of FIG. 7, Setup Phone is selected. As shown in FIG. 8A, a Bluetooth LAN connection already exists. When a user elects to configure a new Bluetooth PC connection, various screens are automatically generated in a sequence which will guide the user through properly configuring the Bluetooth Phone connection. To setup a Bluetooth connection to a phone, the phone must be Bluetooth enabled. This connection, when properly configured, will also be listed in the "Via" user interface.

With reference to FIG. 8B, and to step 710 of FIG. 7, a phone model is selected. A drop-down menu (e.g., 805 of FIG. 8B) is provided with a list of common phone models. If a user's phone model is listed, it can be selected at this point. Otherwise, the default model (Standard GSM) can be selected.

Also at this point, the connection profile name (e.g., 810 of FIG. 8B) is also designated. The default name for this Bluetooth connection is "BT Phone (GSM)". A user can designate this as the connection profile name and continue with the configuration process, or enter a different connection name by writing in the graffiti area of the handheld computer and tapping on the "Next" user interface (e.g., 815 of FIG. 8B). The designated connection name will also appear in the Bluetooth Application Connection Screen (e.g., FIG. 8A) when setup is complete.

With reference to step 715 of FIG. 7, the Bluetooth discovery process is initialized. This process is discussed in step 530 of flow chart 500 and can be referenced there if necessary.

With reference to FIG. 8C, and to step 720 of FIG. 7, discovery results are displayed. As shown in FIG. 8C, a list of the Bluetooth devices of the type selected (e.g., Bluetooth Phone) that are discoverable is displayed. The first device on the list is highlighted by default. At this point, the user may initiate another Bluetooth discovery if, for example, the desired device is not listed in the discovery results by tapping the "Find More" user interface (e.g., 820 of FIG. 8C). Canceling a discovery initiated at this point returns the user to the original discovery results screen as shown in FIG. 8C. The user is then instructed in FIG. 8D to prepare their phone for pairing. Pairing will add the phone to the trusted device list of the handheld computer. This enables the user to use the connection in the future without having to enter a passkey for the phone. Different phone models may have slightly different methods for pairing or preparing the device in order for it to be discoverable by another Bluetooth device. For example, in some instances, a passkey for a phone model may have to be provided by the manufacturer.

Figure 8F:
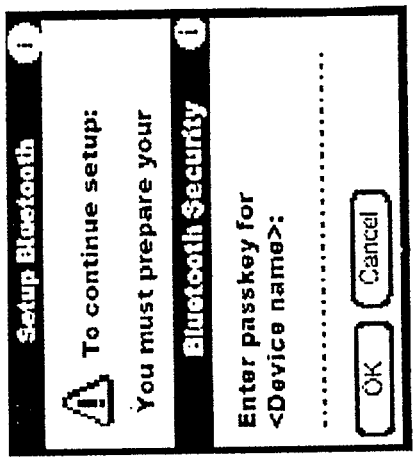
Figure 8E:
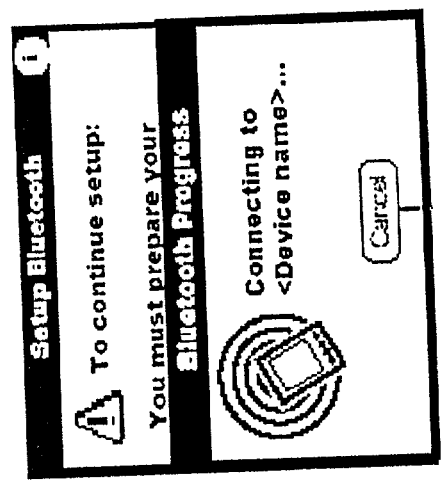
Figure 8D:
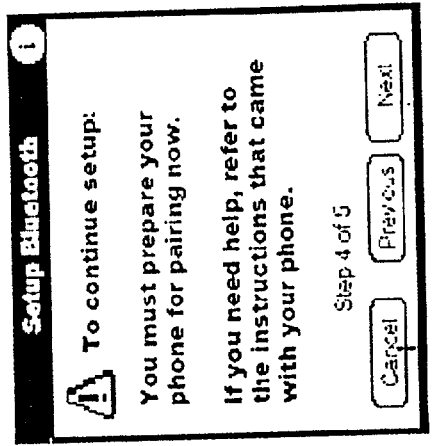

With reference to FIG. 8E, and to step 725 of FIG. 7, connection to the phone is initiated. The device name of the phone to be connected to is displayed while the connection process occurs. If the device is not connectable, the user is shown an error dialog screen and returned to the screen shown in FIG. 8C. The user may continue attempting to connect with the designated phone until a connection is made.

With reference to FIG. 8F, and to step 730 of FIG. 7, a passkey is provided. A user provides a passkey which, in some devices, is set by the manufacturer. The passkey entered is checked against the device cache passkey or an administrator list. If the passkeys match, the phone is allowed to become a trusted device and the connection process continues. If the passkey fails and the phone cannot be authenticated, most mobile phones will fail to connect and a trusted relationship will not be created. This means that a passkey will have to be provided each time the connection is made. However, the user can initiate additional attempts to authenticate the passkey before proceeding.

Figure 8I:
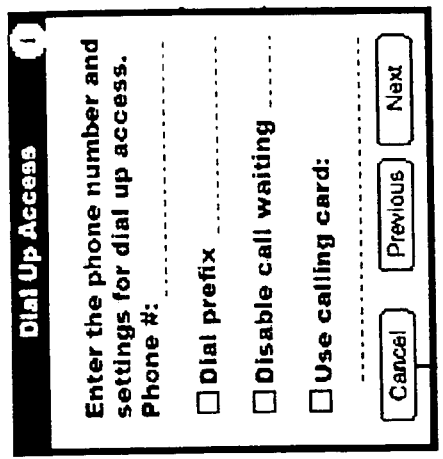
Figure 8H:
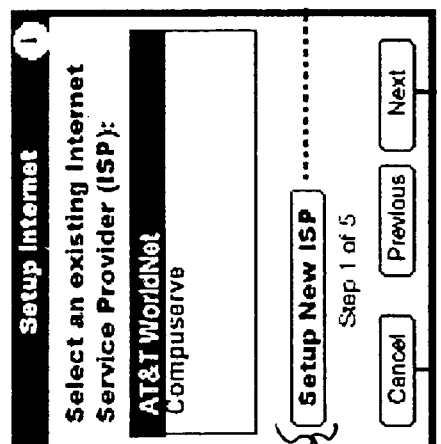
Figure 8G:
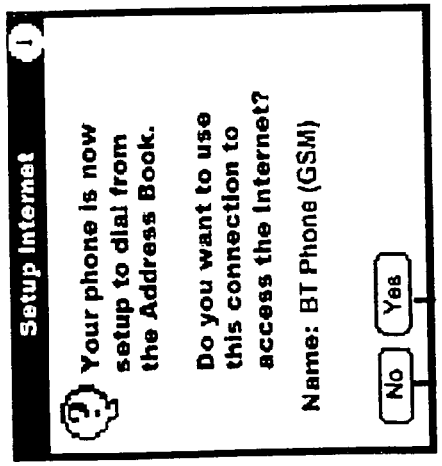
Figure 8L:
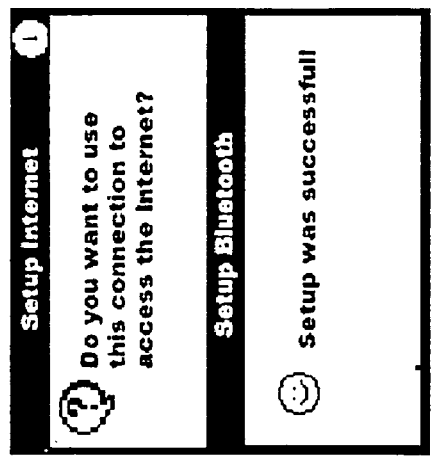

With reference to FIG. 8G, and to step 735 of FIG. 7, a screen is displayed asking the user to designate whether the connection being configured will be used to access the Internet. If the user does not want this connection to access the Internet, the setup process is complete. A screen, as shown in FIG. 8L, is displayed informing the user that setup was successful and, after a short wait, the user is displayed the Bluetooth Application Connection Screen as shown in FIG. 8A. If the user wants the connection to access the Internet, flow chart 700 continues.

With reference to FIG. 8H, and to step 740 of FIG. 7, and Internet Service Provider is selected. Any existing dialup network profiles are listed. The current profile is highlighted by default. If user selects the highlighted profile, a duplicate dialup profile is created for use with the connection profile being created, and the setup process is completed. A screen, as shown in FIG. 8L, is displayed informing the user that setup was successful and, after a short wait, the user is displayed the Bluetooth Application Connection Screen as shown in FIG. 8A. Otherwise, the user taps the "Setup New ISP" user interface (e.g., 825 of FIG. 8H) and a screen (not shown) is displayed where the user can enter a name for the new Internet Service Provider.

With reference to FIG. 8I, and to step 745 of FIG. 7, dialup access is configured. To configure a new dialup profile, a screen (e.g., FIG. 8I) is displayed. To enable the Bluetooth Phone connection to access the Internet, the user enters a phone number. Other options the user can configure include providing a dialing prefix, disabling call waiting, and providing a calling card number.

Figure 8K:
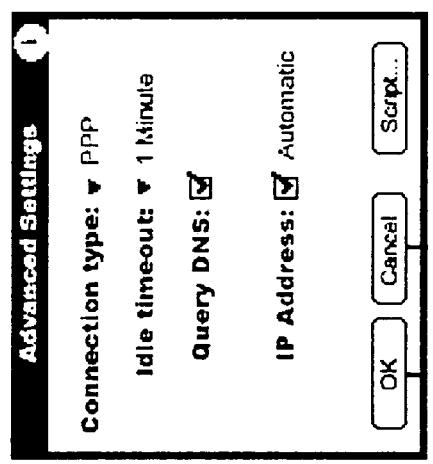
Figure 8J:
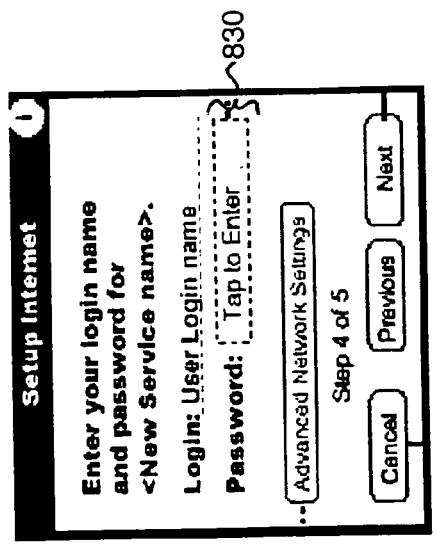

With reference to FIG. 8J, and to step 750 of FIG. 7, the login name for the Internet Service Provider is entered. At this point the user has the option of changing the default network configuration by tapping on the "Advanced Network Settings" user interface before continuing. As shown in FIG. 8K, advanced settings that can be set by the user include the connection type, an idle timeout setting, the option to query a Domain Name Server, and the option for automatic IP addressing. The user then taps the user interface (e.g., 830 of FIG. 8J) in the "Password" field to enter a password for accessing the Internet Service Provider.

With to step 760 of FIG. 7, the user is returned to the Bluetooth Application Connection Screen. The user has successfully configured the Bluetooth Phone connection. A screen, as shown in FIG. 8L, is displayed informing the user that setup was successful and, after a short wait, the user is displayed the Bluetooth Application Connection Screen as shown in FIG. 8A.

In so doing, the present invention provides a method for configuring Bluetooth Phone connection that clearly shows a user the connection between a given network profile and its associated connection profiles.

FIG. 9 is a flow chart of a method for configuring a new Bluetooth LAN connection in accordance with one embodiment of the present invention. FIGS. 10A-10G show exemplary graphical user interface screens used in configuring new Bluetooth LAN connections is accordance with one embodiment of the present invention as set forth in flow chart 900 of FIG. 9. For purposes of clarity, the following discussion will utilize the exemplary screens of FIGS. 10A-10G in conjunction with flow chart 900 of FIG. 9, to clearly describe one embodiment of the present invention.

With reference to FIG. 10A, and to step 910 of FIG. 9, Bluetooth LAN Access is selected. As shown in FIG. 8A, a Bluetooth LAN connection already exists. However, the present invention is well suited to provide connect with multiple networks as well as providing multiple connections to a given network. When a user elects to configure a new Bluetooth LAN connection, various screens are automatically generated in a sequence which will guide the user through properly configuring the Bluetooth LAN connection. This connection, when properly configured, will also be listed in the "Via" user interface 1005.

With reference to FIG. 10B, and to step 920 of FIG. 9, a connection name is entered. Screen 10B is displayed allowing a user to use the default connection name (e.g., Bluetooth LAN) by tapping on the "Next" user interface 1010. The connection name entered by the user will appear in the Bluetooth Application Connection Screen FIG. 10A when setup is complete. Alternatively, a user can enter a different connection name by writing in the graffiti area of the handheld computer and tapping on the "Next" user interface 1010. Another screen (not shown) is then displayed instructing the user that, in some cases, a user name and password may be needed to connect with the desktop computer unless this has been previously set up by a network administrator or is not necessary.

With reference to FIG. 10C, and to step 930 of FIG. 9, the Bluetooth discovery process is initiated. The discovery process is discussed in detail at step 530 of flow chart 5 which can be referenced if necessary. FIG. 10C shows the screen displayed when the discovery process is preparing to execute.

Figures 10D, 10E:
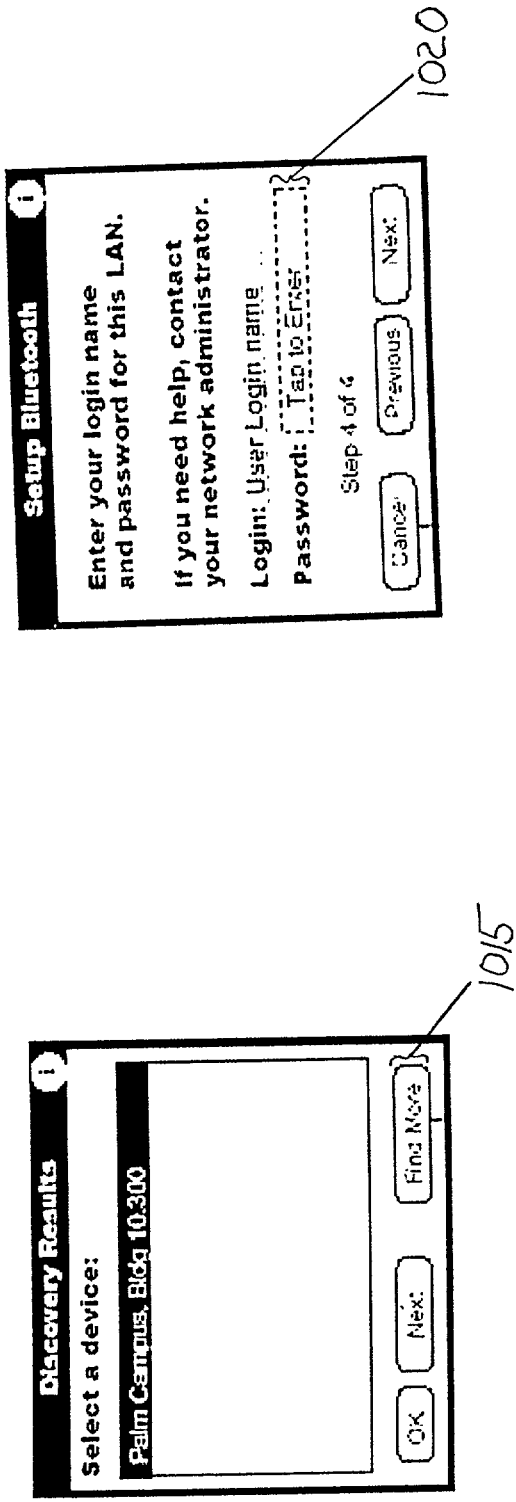

With reference to FIG. 10D, and to step 940 of FIG. 9, the discovery results are displayed. As shown in FIG. 10D, a list of the Bluetooth LAN access devices that are discoverable is displayed. The first device on the list is highlighted by default. At this point, the user may initiate another Bluetooth discovery if, for example, the desired device is not listed in the discovery results by tapping on the "Find More" user interface 1015. Canceling a discovery initiated at this point returns the user to the original discovery results screen as shown in FIG. 10D.

With reference to FIG. 10E, and to step 950 of FIG. 9, a LAN login setup screen is displayed. To connect to a Bluetooth LAN, a login name and password are entered. The user enters a login name and taps the "Password" user interface 1020. A screen, as shown in FIG. 10F, is displayed for a user to enter a LAN password. When a LAN password is entered, the user is returned to the screen shown in FIG. 10E, Password user interface 1020 indicates that a password has been assigned.

Figure 10G:
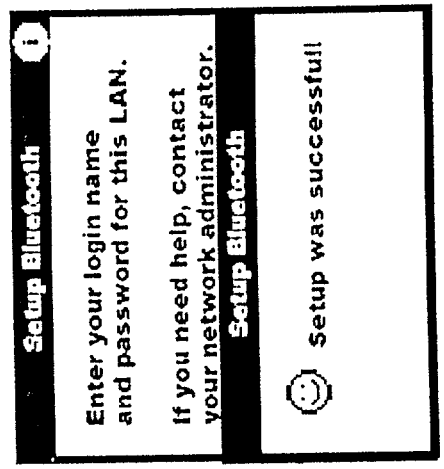
Figure 10F:
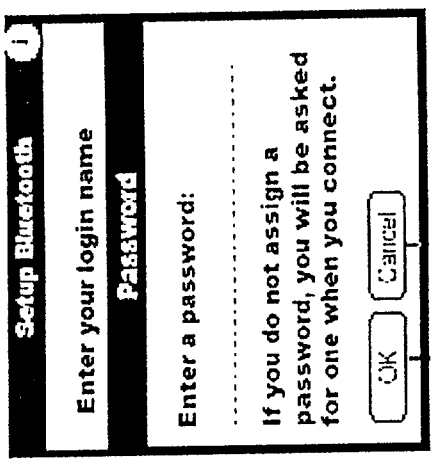

With reference to FIG. 10G, and to step 960 of FIG. 9, the user is returned to the Bluetooth Application Connection screen. The user has successfully configured the Bluetooth LAN connection upon entering a user name and password. A screen, as shown in FIG. 10G, is displayed informing the user that setup was successful and, after a short wait, the user is displayed the Bluetooth Application Connection Screen as shown in FIG. 10A.

In so doing, the present invention provides a method for configuring Bluetooth LAN connection that clearly shows a user the connection between a given network profile and its associated connection profiles.

The preferred embodiment of the present invention, a method for selecting and configuring Bluetooth connections in an electronic device, is thus described. While the present invention has been described in particular embodiments, it should be appreciated that the present invention should not be construed as limited by such embodiments, but rather construed according to the following claims.

What is claimed is:

1. A method for selecting and configuring wireless connections for a portable electronic device associated with a network, the method being performed by a processor of the portable electronic device and comprising:
    displaying a first screen on a display of the portable electronic device, the first screen showing a plurality of communication protocols, each of the plurality of communication protocols being associated with a different type of wireless enabled device;
    receiving a user selection of one of the plurality of communication protocols;
    based on the selected communication protocol, identifying one or more wireless enabled devices of the type associated with the selected communication protocol and within range of the portable electronic device using a wireless discovery process;
    displaying a second screen on the display, the second screen showing the identified one or more wireless enabled devices;
    receiving a user selection of one of the one or more wireless enabled devices;
    displaying a third screen on the display, the third screen showing one or more network configuration options for a network associated with the selected wireless enabled device;
    receiving a user selection of one or more of the network configuration options; and
    wirelessly linking the portable electronic device with the wireless enabled device and the network using the selected network configuration options.

2. The method of claim 1, wherein the first screen includes a drop-down menu for displaying the plurality of communication protocols.

3. The method of claim 1, further comprising:
    enabling a user configuration of the wireless enabled device to cause the wireless enabled device to directly connect to the network via a sequence of screens on the display of the portable electronic device.

4. The method of claim 3, wherein the wireless discovery process includes a search for Bluetooth devices that are of the type associated with the selected communication protocol.

5. The method of claim 1, wherein the user selection of one of the one or more wireless enabled devices initiates a sequence of configuration screens that prompt the user to configure the connection of the wireless enabled device to the network.

6. The method of claim 5, wherein the sequence of configuration screen includes a passkey screen that prompts the user to enter a passkey for the wireless enabled device to configure the connection of the wireless enabled device to the network.

7. A method for selecting and configuring wireless connections for a portable electronic device, the method being performed by a processor of the portable electronic device and comprising:
    displaying a first screen on a display of the portable electronic device, the first screen showing a plurality of communication protocols, each of the plurality of communication protocols being associated with a different type of wireless enabled phone;
    receiving a user selection of one of the plurality of communication protocols;
    based on the selected communication protocol, identifying one or more wireless enabled phones within range of the portable electronic device using a wireless discovery process;
    displaying a second screen on the display, the second screen showing the identified one or more wireless enabled phones;
    based on a user selection of an identified wireless enabled phone, displaying a third screen on the display, the third screen showing one or more network configuration options for a network associated with the selected wireless enabled phone; and
    based on a user selections of one or more of the network configuration options, wirelessly linking the portable electronic device with the wireless enabled phone and the network using the selected network configuration options.

8. The method of claim 7, wherein the first screen includes a drop-down menu for displaying the one or more communication protocols.

9. The method of claim 7, further comprising:
    enabling a user configuration of the wireless enabled phone to cause the wireless enabled phone to directly connect to the network via a sequence of screens on the display of the portable electronic device.

10. The method of claim 9, wherein the network associated with the wireless enabled phone is the Internet.

11. The method of claim 7, wherein the user selection of the specified wireless enabled phone initiates one or more configuration screens, the one or more configuration screens including a passkey screen that prompts the user to enter a passkey for the wireless enabled phone to configure the connection of the wireless enabled phone to the network.

* * * * *